(12) United States Patent
Endres et al.

(10) Patent No.: US 7,853,978 B2
(45) Date of Patent: Dec. 14, 2010

(54) REMOTE ANTENNA AND LOCAL RECEIVER SUBSYSTEMS FOR RECEIVING DATA SIGNALS CARRIED OVER ANALOG TELEVISION

(76) Inventors: Thomas J. Endres, 4510 SW. Henderson St., Seattle, WA (US) 98136; Wonzoo Chung, 6117 S237th St., #D302, Kent, WA (US) 98032; Slobodan Simovich, 77 Dow Pl., Apt. #311, San Francisco, CA (US) 94107; W. Leo Hoarty, 3465 Oak Hill Ct., Morgan Hill, CA (US) 95037

( * ) Notice: Subject to any disclaimer, the term of this patent is extended or adjusted under 35 U.S.C. 154(b) by 994 days.

(21) Appl. No.: 11/299,318

(22) Filed: Dec. 9, 2005

(65) Prior Publication Data

US 2006/0212910 A1      Sep. 21, 2006

Related U.S. Application Data

(63) Continuation of application No. 11/109,454, filed on Apr. 18, 2005, now abandoned.

(60) Provisional application No. 60/562,814, filed on Apr. 16, 2004.

(51) Int. Cl.
*H04N 7/18*    (2006.01)
(52) U.S. Cl. .................. 725/74; 725/85; 725/135
(58) Field of Classification Search .............. 725/74, 725/85, 135
See application file for complete search history.

(56) References Cited

U.S. PATENT DOCUMENTS

| 4,608,710 A | 8/1986 | Sugiura |
| 5,134,464 A * | 7/1992 | Basile et al. ............ 348/487 |
| 5,483,663 A | 1/1996 | Tawil |
| 5,898,900 A | 4/1999 | Richter et al. |
| 5,926,744 A | 7/1999 | Fukuzawa et al. |
| 5,999,137 A | 12/1999 | Crosby |
| 6,014,546 A | 1/2000 | Georges et al. |
| 6,031,878 A | 2/2000 | Tomasz et al. |
| 6,134,419 A | 10/2000 | Williams |

(Continued)

FOREIGN PATENT DOCUMENTS

JP      401077230 A     3/1989

(Continued)

OTHER PUBLICATIONS

Simovich, Slobodan, et al., "ReX: A dNTSC Receiver System-on-Chip", presentation presented at Stanford University's Hot Chips Conference in Aug. 2003, http://www.hotchips.org/archive/archive_hc15_toc.html, 20 pages of presentation, plus 1 page entitled "Hot Chips Archive—A Symposium on High Performance Chips", both printed Jan. 25, 2005.

*Primary Examiner*—Joseph P Hirl
*Assistant Examiner*—Jivka Rabovianski
(74) *Attorney, Agent, or Firm*—Perkins Coie LLP

(57) ABSTRACT

Methods and apparatus for remote antenna subsystems that are physically isolated from receiver subsystems are disclosed. The communication between the two subsystems uses remote communication links. The remote communication links are either wireless, in which case they are designed for indoor low power communications, or are wired, using existing infrastructure in the household such as the power lines. Partitioning between the antenna and receiver subsystems is selectable.

47 Claims, 10 Drawing Sheets

Block diagram of remote communication subsystem 275 and its components in accordance with a third embodiment of the present invention, in which matched filter samples are communicated over the remote communication link.

U.S. PATENT DOCUMENTS

| | | | |
|---|---|---|---|
| 6,205,188 B1 * | 3/2001 | Stott et al. | 375/344 |
| 6,430,233 B1 | 8/2002 | Dillon et al. | |
| 6,433,835 B1 | 8/2002 | Hartson | |
| 6,526,101 B1 | 2/2003 | Patel | |
| 6,928,111 B2 * | 8/2005 | Kim | 375/231 |
| 6,967,694 B1 * | 11/2005 | Ninomiya et al. | 348/726 |
| 2002/0034958 A1 | 3/2002 | Oberschmidt et al. | |
| 2002/0038458 A1 | 3/2002 | Staal et al. | |
| 2002/0059368 A1 * | 5/2002 | Reynolds | 709/203 |
| 2002/0059615 A1 | 5/2002 | Okawara et al. | |
| 2002/0061024 A1 * | 5/2002 | Malkemes et al. | 370/401 |
| 2002/0083458 A1 | 6/2002 | Henderson et al. | |
| 2002/0087984 A1 | 7/2002 | Maeda et al. | |
| 2002/0154055 A1 | 10/2002 | Davis et al. | |
| 2003/0007103 A1 | 1/2003 | Roy | |
| 2003/0023978 A1 | 1/2003 | Bajgrowicz | |
| 2003/0112370 A1 | 6/2003 | Long et al. | |
| 2003/0163821 A1 | 8/2003 | Knutson et al. | |
| 2004/0003408 A1 * | 1/2004 | Yu et al. | 725/85 |
| 2004/0068744 A1 * | 4/2004 | Claussen et al. | 725/81 |
| 2004/0110468 A1 * | 6/2004 | Perlman | 455/13.3 |

FOREIGN PATENT DOCUMENTS

JP         2003209618         7/2003

* cited by examiner

Prior art datacasting system over analog television broadcast, where receiver system is collocated with television Datacasting system over analog television broadcast Datacasting receiver system, with candidate partitions defined for communication through remote communication subsystem.

Block diagram of remote communication subsystem and its components in which a digitized IF signal is communicated over the remote communication link.

Block diagram of remote communication subsystem and its components in which Nyquist and CVSB filter outputs and sync data are communicated over the remote communication link.

Block diagram of remote communication subsystem 275 and its components in accordance with a third embodiment of the present invention, in which matched filter samples are communicated over the remote communication link.

Block diagram of remote communication subsystem and its components in which equalized (and framed) samples are communicated over the remote communication link.

Block diagram of remote communication subsystem and its components in which MPEG transport stream data from a datacasting receiver are communicated over the remote communication link.

Television broadcast communication system with outdoor antenna subsystem.

Television broadcast communication system using a single receiver subsystem which combines signals from multiple antenna subsystems (three shown).

REMOTE ANTENNA AND LOCAL RECEIVER SUBSYSTEMS FOR RECEIVING DATA SIGNALS CARRIED OVER ANALOG TELEVISION

CROSS-REFERENCE TO RELATED APPLICATION(S)

This application is a continuation of U.S. application Ser. No. 11/109,454, filed Apr. 18, 2005 now abandoned, which claims the benefit of U.S. Provisional Patent Application No. 60/562,814, filed on Apr. 16, 2004. It is also related to U.S. patent application Ser. No. 09/062,225, filed Apr. 17, 1998, now U.S. Pat. No. 6,433,835, Issued Aug. 13, 2002 entitled "EXPANDED INFORMATION CAPACITY FOR EXISTING COMMUNICATION TRANSMISSION SYSTEMS"; PCT Application No. PCT/US1999/08513, filed Jun. 16, 1999 entitled "EXPANDED INFORMATION CAPACITY FOR EXISTING COMMUNICATION TRANSMISSION SYSTEMS"; U.S. patent application Ser. No. 10/319,671, filed Aug. 9, 2002 entitled "EXPANDED INFORMATION CAPACITY FOR EXISTING COMMUNICATION TRANSMISSION SYSTEMS"; PCT Application No. PCT/US2003/029423, filed Sep. 17, 2003 entitled "ADAPTIVE EXPANDED INFORMATION CAPACITY FOR TELEVISION COMMUNICATIONS SYSTEMS"; U.S. patent application Ser. No. 10/246,084, filed Sep. 18, 2002 entitled "ADAPTIVE EXPANDED INFORMATION CAPACITY FOR COMMUNICATIONS SYSTEMS"; U.S. patent application Ser. No. 10/255,799, filed Sep. 25, 2002 entitled "CABLE TELEVISION SYSTEM COMPATIBLE BANDWIDTH UPGRADE USING EMBEDDED DIGITAL CHANNELS"; and PCT Application No. PCT/US2003/030327, filed Sep. 24, 2003 entitled "CABLE TELEVISION SYSTEM AND METHOD FOR COMPATIBLE BANDWIDTH UPGRADE USING EMBEDDED DIGITAL CHANNELS".

BACKGROUND

The ever increasing consumer expectations regarding multi-media delivered to households place significant burden on the equipment and infrastructure providing these services. In some cases, such as cable systems, heavy up-front costs incur for laying cable in residential neighborhoods, while in other cases, such as terrestrial digital television (DTV) broadcasts, cost-effective equipment that can reliably provide indoor reception remains more of a promise than a product.

Such barriers to entry have forced businesses to seek alternative methods of delivering rich multi-media content to the households. For example, to provide broadband internet access, Digital Subscriber Loop (DSL) technology uses multi-carrier modulation of digital data over decades old twisted-pair copper wires that have existed for telephony services. Broadband connectivity through existing copper networks that are not designed for such data-rates, while providing an advantage over cable, has slowed down the anticipated roll-out of DSL (digital subscriber loop) and, thus, many neighborhoods in the U.S. are connected by broadband cable.

The terrestrial television broadcast provides an existing infrastructure capable of reaching hundreds of millions of consumers, though, by nature, it is a one-way communication system. The lack of a return communication link (i.e. from consumer to central office) severely limits the utility of this broadcast system, despite the appeal that no wires or cables need to be installed. Datacasting is a technique that broadcasts ancillary data together with a television signal, but, despite its appeal, has been largely unsuccessful in the past. In 2003, however, the Walt Disney Corporation launched a video-on-demand service called MovieBeam using datacasting techniques, and to date, it is the largest and most successful datacasting effort over analog television.

The MovieBeam technology inserts a data-bearing subcarrier, which is in quadrature to the video carrier, into the video signal. By maintaining quadrature to the video carrier, impairment of the analog television signal is kept to an imperceptible level, allowing normal television reception. It also facilitates the reception of the digital data with a special receiver set-top-box. These data insertion and extraction techniques are described in the U.S. Pat. No. 6,433,835, titled "Expanded Information Capacity For Existing Communication Systems," issued to Ted Hartson et al., and the U.S. patent application Ser. No. 10,246,084, titled "Adaptive Expanded Information Capacity For Communication Systems," by Chris Long et al., filed Sep. 18, 2002.

DETAILED DESCRIPTION

Aspects of the invention relate to a datacasting receiver system that can be installed in a household and reliably receive data signals and distribute them throughout the household. The datacasting receiver system comprises two subsystems, an "antenna subsystem" and a "receiver subsystem," which need not be collocated. As a result, the antenna subsystem can be placed anywhere in or in the vicinity of the household to receive the broadcast signal, such as in an attic or near an upper-story window, but not necessarily near a television, and can communicate via wired or wireless means to the receiver subsystem that is collocated with a television or a viewing device.

In accordance with aspects of the invention, for reliable indoor reception of data, which is carried over analog television signals, the antenna subsystem is physically isolated from the receiver subsystem and communicates with the receiver through a "remote communication link." The remote communication link is either wireless, in which case it is designed for indoor low power communications, or wired, which uses an existing infrastructure in the household, such as the power lines. In addition, partitioning of demodulation processing steps between the antenna subsystem and the receiver subsystem is selectable.

Various embodiments are described below, providing specific details for a thorough understanding of different aspects of the invention. However, one skilled in the art will understand that the invention may be practiced without such details. In other instances, well-known structures and functions have not been shown or described in detail to avoid unnecessarily obscuring the embodiments.

Figure 1:
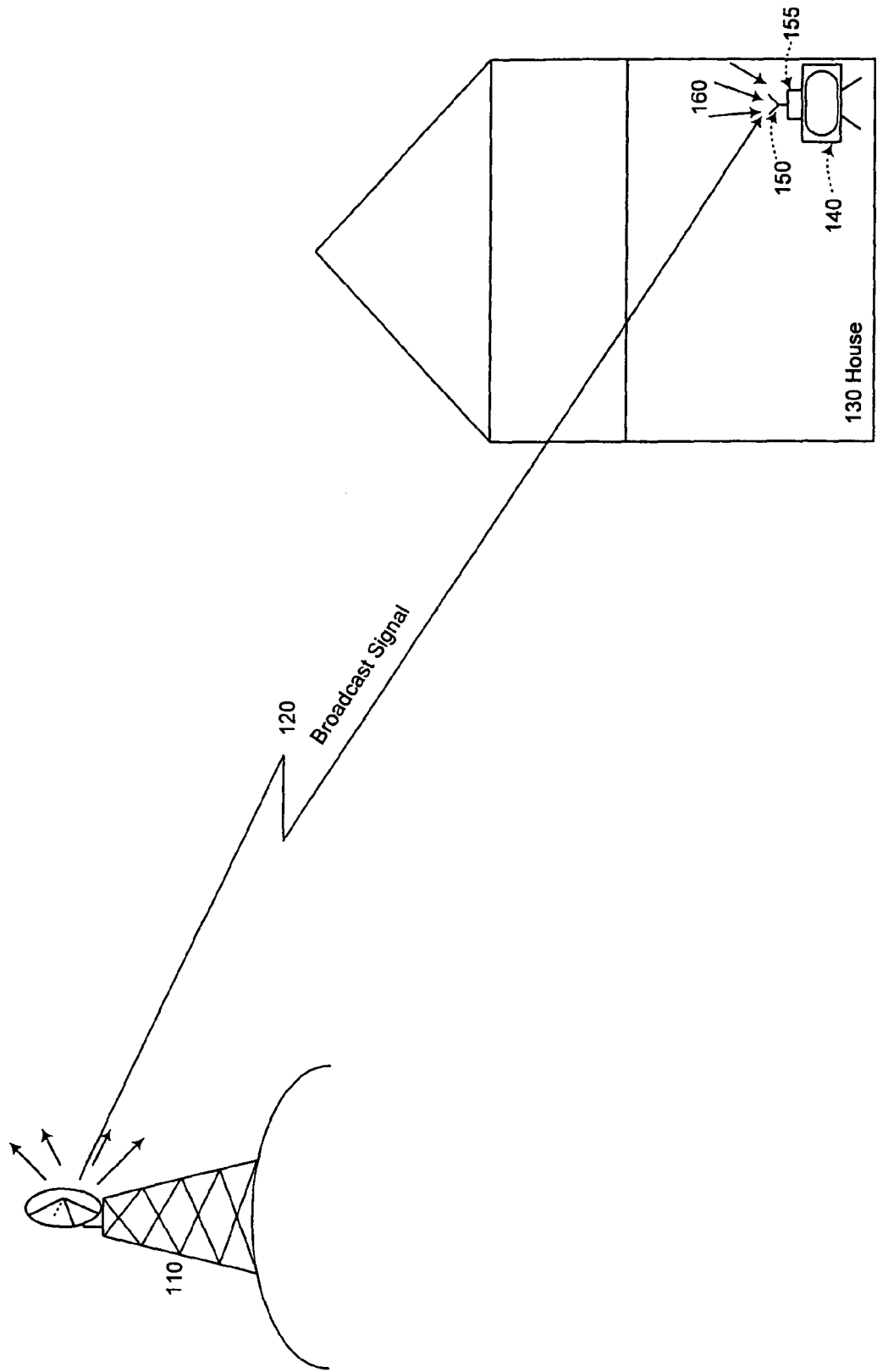
FIG. 1 shows a prior art datacasting system over analog television broadcast, where a receiver system is collocated with a television.

FIG. 1 depicts a typical prior art television broadcasting and datacasting communication system. Transmitter station 110 broadcasts television signal 120, including television content and digital data, as described in U.S. Pat. No. 6,433,835, titled "Expanded Information Capacity For Existing Communication Systems," issued to Ted Hartson et al., and U.S. patent application Ser. No. 10,246,084, titled "Adaptive Expanded Information Capacity For Communication Systems," by Chris Long et al., filed Sep. 18, 2002, which radiates through house 130 to antenna 150. Antenna 150 feeds set-top-box 155 that is used to extract the digital data which is datacast concurrently with the analog television signal, e.g. NTSC (national television systems committee) or PAL (phase alternating line).

The induced penetration loss of the RF signal power through house 130 can be as much as 20 dB. Antenna 150 and set-top-box 155 are in close proximity to television 140. Antenna 150 also receives multipath signals 160, which can be caused by reflections from other buildings or by items interior to the house 130, such as walls, furniture, persons, etc. Furthermore, in most viewing environments, television 140 is located in a communal part of the house 130, so that reflections from moving persons, etc. induce time varying multipath signals 160. Penetration loss through the house 130, and multipath reflections 160 can be significant enough to prevent indoor reception when antenna 150 and set-top-box 155 are collocated with television 140.

Figure 2:
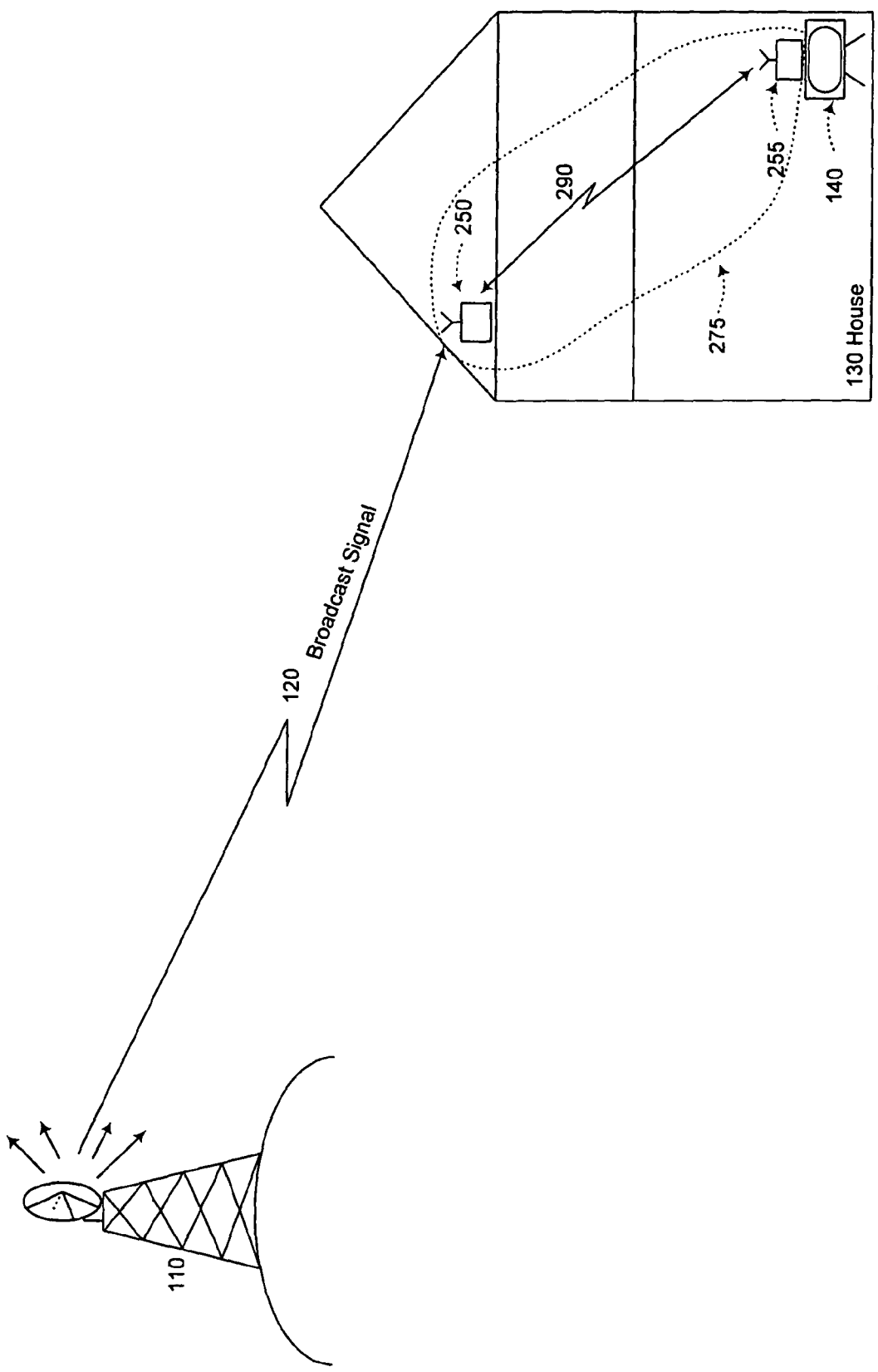
FIG. 2 shows a datacasting system over analog television broadcast in accordance with an embodiment of the invention.

FIG. 2 depicts a television broadcasting communication system in accordance with one aspect of the invention. A television signal 120, including television content and digital data, radiates to an antenna subsystem 250. Unlike the antenna 150 in FIG. 1, the antenna subsystem 250 is located in a part of the house 130, such as the attic, top floor, or near a window, to reduce the multipath signals 160 and the penetration loss through the house 130. The antenna subsystem 250 communicates the digital data to a receiver subsystem 255 through a remote communication link 290. In accordance with an embodiment of this invention, the remote communication link 290, remote antenna subsystem 250, and receiver subsystem 255 are jointly designed for distribution of digital data inside the house 130.

Remote Communication Link

As shown in FIG. 2, a remote communication subsystem 275 comprises the antenna subsystem 250, receiver subsystem 255, and remote communication link 290, which can be jointly optimized. The following paragraphs describe several embodiments that illustrate different partitioning options between the two subsystems 250 and 255.

Figure 3:
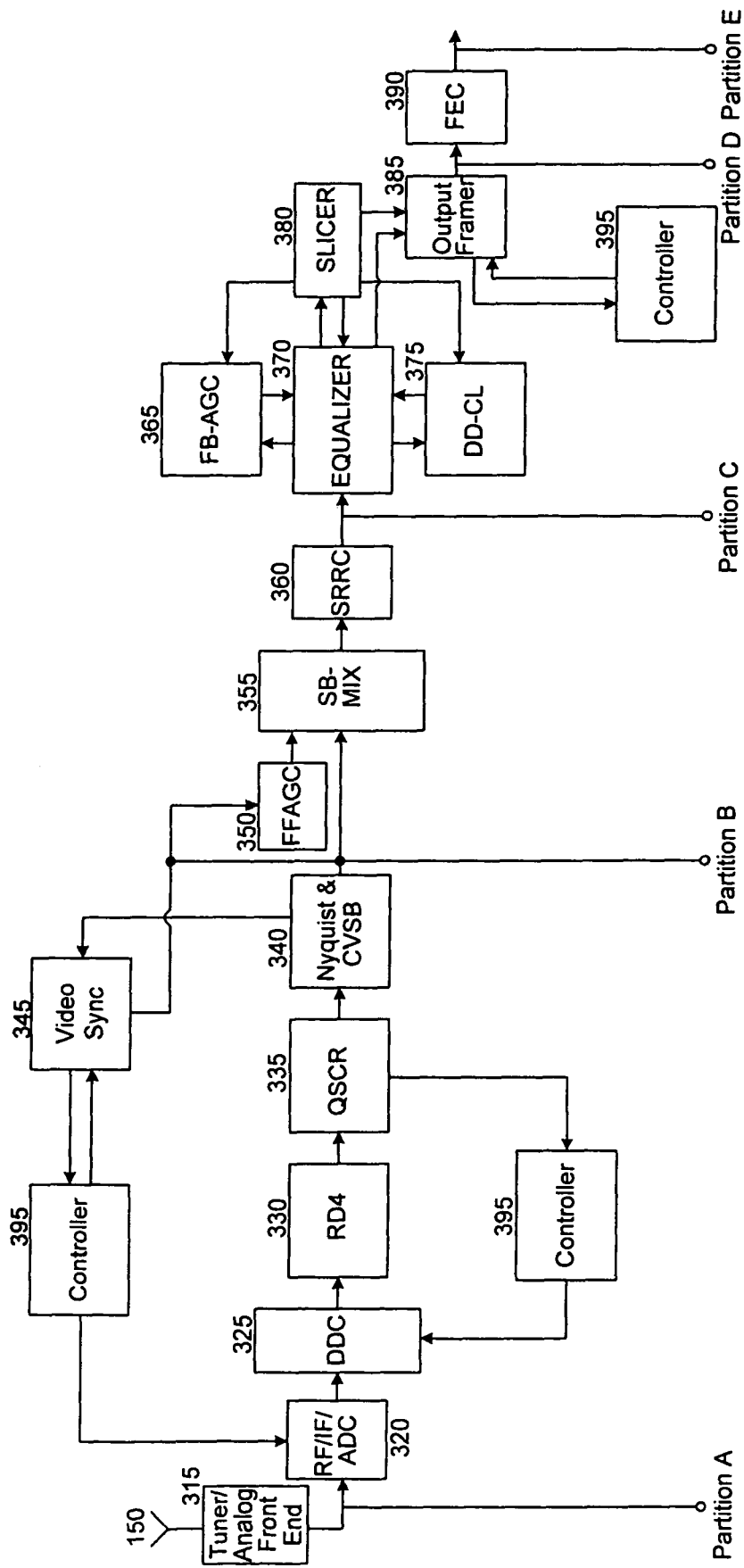
FIG. 3 shows a datacasting receiver system, with candidate partitions defined for communication through remote communication subsystem in accordance with another embodiment of the invention.

FIG. 3 shows a datacasting receiver system, with candidate partitions for communication within the remote communication subsystem 275. Antenna 150 receives television broadcast signal 120, including television content and digital data, and is coupled to a Tuner/Analog Front End module 315. Tuner/Analog Front End module 315 tunes to the proper broadcast television channel, performs level setting, frequency translation, and filtering, and couples the signal to an RF/IF/ADC (radio frequency/intermediate frequency/analog-to-digital converter) 320. RF/IF/ADC 320 may perform further level setting, frequency translation, and filtering, and also digitizes the analog signal, typically 8-10 bits, supplying the bit stream to a DDC (direct digital downconvert) module 325. The sampling clock of RF/IF/ADC 320 is adjusted by clock signals generated in a controller 395.

DDC module 325 mixes the digitized signal to near baseband, so that the visual carrier is close to DC. Clock signals from controller 395 are used to adjust the digital down-conversion process. DDC module 325 provides the near baseband signal to an RD4 (rate decimation by 4) filter 330, which decimates the sampling rate without corrupting the integrity of the television and data signals. RD4 filter 330 is coupled to a QSCR (quasi-synchronous carrier recovery) module 335, which translates the composite television and data signal to baseband, so that the visual carrier is aligned with a zero degree phasor and the data-bearing subcarrier is aligned with a 90-degree phasor. Furthermore, QSCR module 335 estimates frequency offset from this relationship, and provides a control signal to controller 395. Controller 395 processes this control signal from QSCR module 335 and adjusts the clock governing DDC module 325.

QSCR module 335 is coupled to a Nyquist and CVSB block 340, which performs linear filtering to isolate video and data components. Nyquist and CVSB block 340 also provides a video signal to a Video Sync block 345, which performs synchronization and framing to the analog television signal. Video-Sync block 345 provides control signals based on the analog television signal to a controller 395 and an FF-AGC (feed-forward-automatic-gain-control) module 350. Controller 395 uses the control signals from Video-Sync block 345 to adjust the sampling clock of RF/IF/ADC block 320. FF-AGC module 350 uses the control signals from Video-Sync block 345 to adjust a gain that is applied to the video and data signals in SB-Mix (sub-band mix) module 355.

Video and data components from Nyquist and CVSB block 340 are coupled to an SB-Mix module 355, which adjusts the frequency by the data sub-carrier frequency to translate the video and data signals to precise complex baseband with respect to the data spectrum. Furthermore, SB-Mix module 355 adjusts the gain of the video and data signals according to a control signal derived in FF-AGC module 350.

Video and data signals from SB-Mix module 355 are coupled to an SRRC (square root raised cosine) filter 360, which applies a matched filter, typically a square-root raised cosine filter, to the video and data signals. Further decimation of the sampling rate may occur in SRRC filter 360. SRRC filter 360 is coupled to an equalizer 370 which performs adaptive data equalization and video cancellation. An FB-AGC (feedback automatic gain control) module 365 is coupled to equalizer 370 (and vice versa) and provides fine gain adjustment based on a decision-directed measure. Input to FB-AGC module 365 from a Slicer 380 is used to derive the decision-directed measure. DDCL (decision-directed carrier loop) module 375 is coupled to equalizer 370 (and vice versa) and provides fine phase/frequency adjustment based on a decision-directed measure. Input to DDCL module 375 from Slicer 380 is used to derive the decision-directed measure.

Equalizer 370 is coupled to Slicer 380, which may be a nearest-element decision device, or other quantizers, used to provide (possible partial) estimates of the data symbols. Both equalizer 370 and Slicer 380 are coupled to an output framer 385 which extracts command and control information, payload data, and frames and packages such data. Command and control data is provided to controller 395 from output framer 385, and the controller provides control signals to output framer 385, such as to instruct for proper framing of the data, or for formatting which may be regionally-specific. Framed data is provided from output framer 385 to an FEC (forward error correction) 390, which applies error correcting codes to the data to substantially reduce the bit-error-rate. For example, FEC 390 may apply a concatenated reed-solomon block code with a trellis code, similar to what is performed for terrestrial broadcast of digital television signals in the U.S.

FIG. 3 also shows five partitions of the datacasting receiver system, labeled "Partition A," "Partition B," "Partition C," "Partition D," and "Partition E." The data at one of these partitions is to be communicated over the remote communication link 290 while the leading part of the partitioned system resides in the antenna subsystem 250, and the trailing part resides in the receiver subsystem 255.

Partitioning Antenna and Receiver Subsystems

Partition A: Digitized IF

Figure 4:
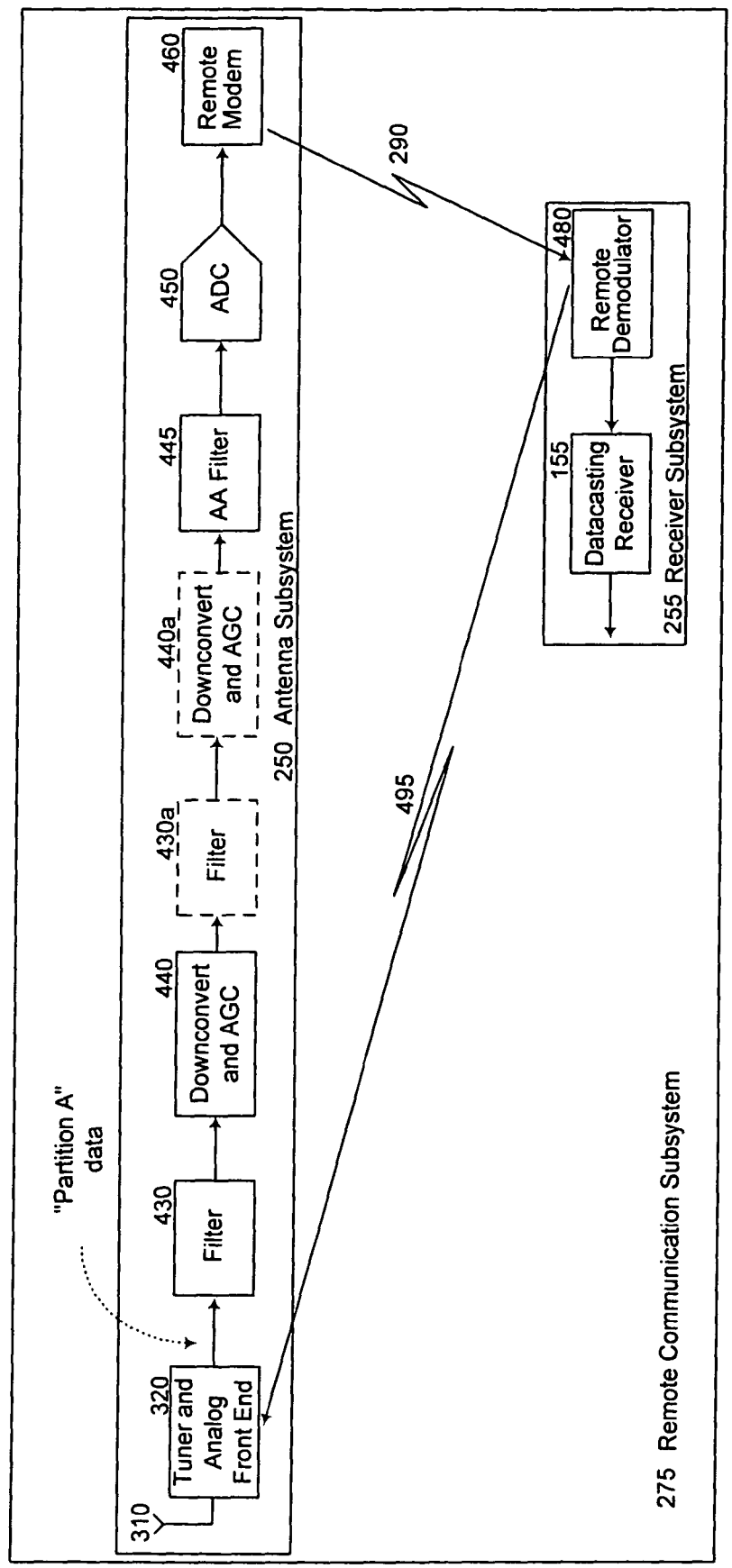
FIG. 4 shows a block diagram of a remote communication subsystem and corresponding components, where a digitized IF (intermediate frequency) signal is communicated over a remote communication link, in accordance with an embodiment of the invention.

In an embodiment of the invention, the remote communication subsystem 275 is designed to transfer the composite signal, including both data and television signals. In Partition A, illustrated in FIG. 3, a digitized low Intermediate Frequency (IF) is provided by antenna 150 to the Tuner and RF AGC module 315, to be communicated to receiver subsystem 255. FIG. 4 shows a block diagram of the remote communication subsystem 275 and its components in accordance with this embodiment.

In FIG. 4, antenna 150 can be a conventional television antenna. Alternatively, and desirably, antenna 150 is an active antenna in accordance with U.S. Patent Application No. 60/351,476 filed Jan. 23, 2002 and titled "Miniature Ultra-Wideband Active Receiving Antenna". Antenna 150 is coupled to Tuner and RF AGC module 320, which also receives control information 495 (like channel number) from receiver subsystem 255. Tuner and RF AGC module 320 tunes to a proper television channel, such as 6 MHz, as directed by control information 495, level sets the 6 MHz signal, and downconverts to a standard IF frequency, for example around 44 MHz. This IF frequency includes both television and data signals and is provided to a filter 430. Filter 430 provides further passband filtering, and couples the passband signal to down-conversion and an AGC module 440, which translates the signal to near baseband, and provides another stage of level setting.

Shown in dashed blocks are a Filter 430a and a down-conversion and AGC module 440a, indicating other, possibly desired, stages of down-conversion, level setting, and IF filtering. Alternatively, IF output samples from Tuner and RF AGC module 320 can be supplied directly to a Filter 445, with no intermediate down-conversion. Filter 445 provides the final stage of rejection, or anti-aliasing, before digitization by an ADC 450. ADC 450 supplies a digitized version of a near baseband (or low IF) of the desired, for example, 6 MHz television channel to a remote modem 460. Remote modem 460 encodes and modulates the desired composite television and data signal, in accordance with techniques suitable for indoor transmission and reception to be discussed below. Remote modem 460 is coupled to remote communication link 290.

A remote demodulator 480 receives the encoded composite television and data signal via remote communication link 290, demodulates the encoded composite television and data signal, and provides a sampled IF version of the composite television and data signal 120 to the datacasting receiver 155.

Since the near baseband signal contains, for example, 6 MHz of content, it will be placed at a low enough IF such that the required transmission bandwidth through remote communication link 290 is limited to 2.5×6 MHz=15 MHz. If ADC 450 provides, for example, 8 bits of the low IF signal, then the remote communication link must support 8 bits×15 MHz=120 Mbps. Various techniques suitable for indoor communication supporting this data rate may be used.

Return channel 495 provides command and control data, like tuner channel selection, and is very low data rate. Return channel 495 may also communicate signal quality to antenna subsystem 250, which can be used to aid the user in placement of antenna subsystem 250 of house 130. For example, an installation procedure may include an antenna placement routine, whereby the user tries various locations in house 130 for antenna subsystem 250, in which case a graphical user interface displays a measure of signal quality on antenna subsystem 250, receiver subsystem 255, or both.

One embodiment of the remote communication subsystem 275 for Partition A uses a wireless, frequency-hopped, spread spectrum communication system for Remote Modem 460, Remote Demodulator 480, and remote communication link 290. Security from interfering neighbors is achieved from the keying of pseudo-random sequence which drives the modulated carrier tones.

Another embodiment of the remote communication subsystem 275 for Partition A uses a wireless, COFDM (coded orthogonal frequency division multiplexing) communication system for Remote modem 460, Remote demodulator 480, and remote communication link 290.

Another embodiment of the remote communication subsystem 275 for Partition A uses a wireless communication system combining COFDM and DS-SS (direct sequence spread spectrum) for Remote Modem 460, Remote Demodulator 480, and remote communication link 290. In this embodiment, each subcarrier in the COFDM system is spread by a spreading sequence in Remote Modem 460 prior to IDFT (inverse discrete Fourier transform) filtering, and is de-spread after DFT (discrete Fourier transform) filtering in Remote Demodulator 480.

Another alternative embodiment of the remote communication subsystem 275 for Partition A uses a wireless, single-carrier QAM (quadrature amplitude modulation) communication system with trellis and reed-solomon error correcting codes or turbo codes for Remote Modem 460, Remote Demodulator 480, and remote communication link 290. See U.S. Pat. No. 6,526,101 issued to C. B. Patel.

Yet another embodiment of the remote communication subsystem 275 for Partition A uses existing Ethernet link, available in a growing number of households, shared with other household communication networks, for Remote Modem 460, Remote Demodulator 480, and remote communication link 290.

Partition B: Nyquist and CVSB Filter Output

Figure 5:
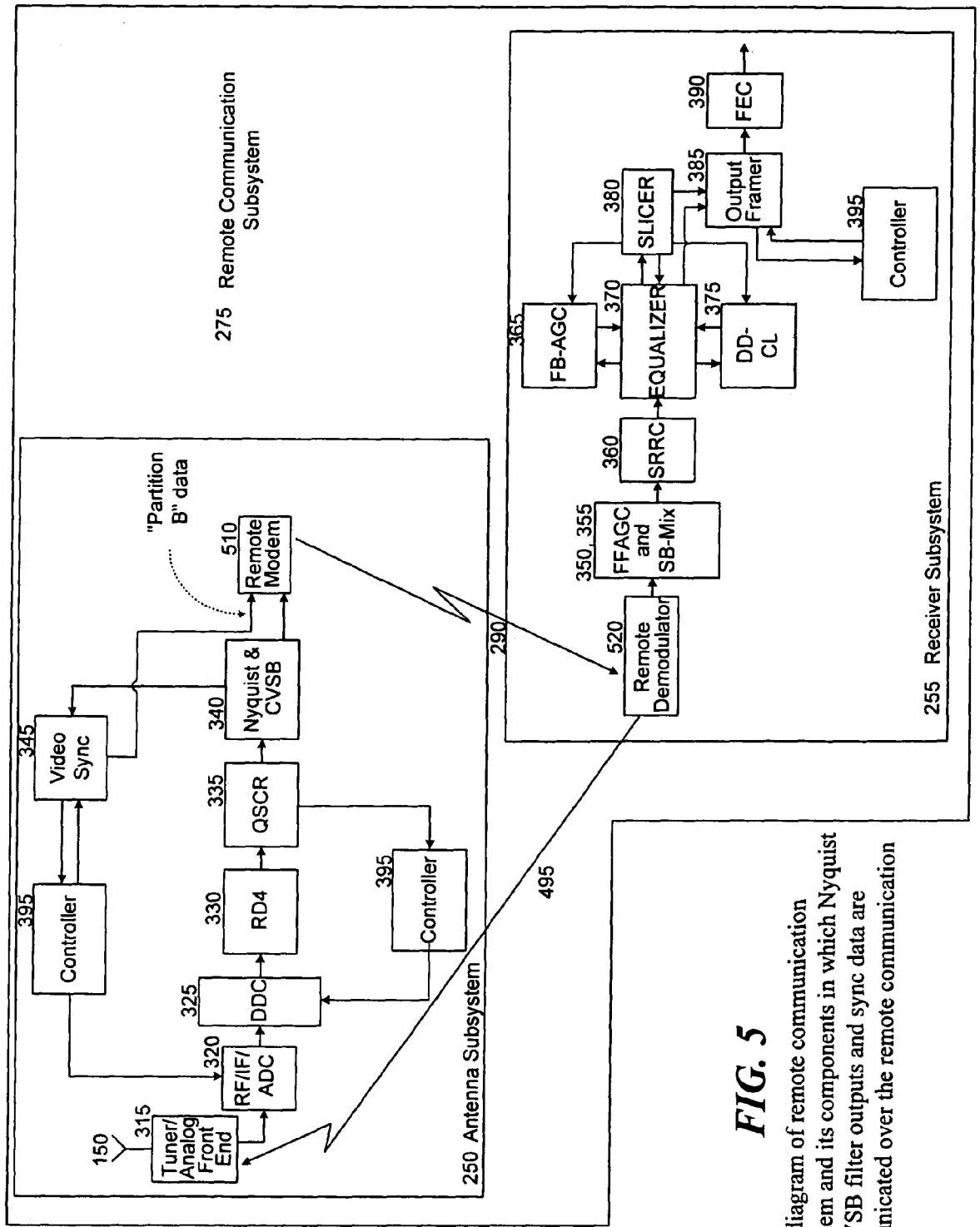
FIG. 5 shows a block diagram of a remote communication subsystem and related components, where Nyquist and CVSB (complementary vestigial sideband) filter outputs and sync data are communicated over a remote communication link in accordance with another embodiment of the invention.

In an alternative partitioning of the involved processes, illustrated in FIG. 5, the antenna subsystem 250 provides a version of the Nyquist and CVSB filter outputs to the remote communication link 290. FIG. 5 shows a block diagram of the remote communication subsystem 275 in accordance with this alternative embodiment, in which Nyquist and CSB filter signals and video signals used for gain control are communicated over the remote communication subsystem 275. Antenna 150 can be a conventional antenna. Alternatively, and desirably, antenna 150 is an active antenna in accordance with the U.S. Patent Application No. 60/351,476 filed Jan. 23, 2002 and titled "Miniature Ultra-Wideband Active Receiving Antenna".

Antenna 150 receives television broadcast signal 120, including television content and digital data, and is coupled to Tuner/Analog Front End module 315. Tuner/Analog Front End module 315 tunes to the proper broadcast television channel, performs level setting, frequency translation, and filtering, and couples the signal to RF/IF/ADC 320. RF/IF/ADC 320 may perform further level setting, frequency translation, and filtering, while it digitizes the analog signal, typically 8-10 bits, and supplies the bit stream to DDC module 325. The sampling clock of RF/IF/ADC 320 is adjusted by clock signals generated in controller 395.

DDC module 325 mixes the digitized signal from DDC module 325 to near baseband, so that the visual carrier is close to DC. Clock signals from controller 395 are used to adjust the digital down-conversion process. DDC module 325 provides the near baseband signal to RD4 filter 330, which decimates the sampling rate without corrupting the integrity of the television and data signals. RD4 filter 330 is coupled to QSCR module 335, which translates the composite television and data signal to baseband, so that the visual carrier is aligned with a zero degree phasor and the data-bearing subcarrier is aligned with a 90-degree phasor. Furthermore, QSCR module 335 estimates frequency offset from this relationship, and provides a control signal to controller 395. Controller 395 processes this control signal from QSCR module 335 and adjusts the clock governing DDC module 325.

QSCR module 335 is coupled to Nyquist and CVSB block 340, which performs linear filtering to isolate video and data components. Nyquist and CVSB block 340 also provides a video signal to Video Sync block 345, which performs synchronization and framing to the analog television signal. Video Sync block 345 provides control signals based on the analog television signal to controller 395 and to remote modem 510. Controller 395 uses the control signals from Video Sync block 345 to adjust the sampling clock of RF/IF/ADC block 320.

The output of the Nyquist and CVSB filter 340, together with the control signals from video sync block 345 are the "Partition B" data from FIG. 3, and is to be communicated over the remote communication link 290. Therefore, these signals are supplied to Remote Modem 510. Remote Modem 510 encodes and modulates these desired signals, and is coupled to remote communication link 290 in accordance with techniques suitable for indoor transmission and reception, discussed below.

Remote Demodulator 520 receives the encoded Nyquist and CVSB filter 340 and video sync block 345 signals via remote communication link 290. Remote Demodulator 520 performs all analog and digital filtering, down-conversion, level setting, equalization, and decoding of the encoded television signal required to recover the Nyquist and CVSB filter 340 and video sync block 345 signals that were communicated through remote communication link 290. Remote Demodulator 520 provides the recovered Nyquist and CVSB filter 340 and video sync block 345 signals to FF-AGC 350 and SB-Mix 355 modules.

Recovered video and data components from Nyquist and CVSB block 340 are coupled to SB-Mix module 355, which adjusts the frequency by the data sub-carrier frequency to translate the video and data signals to complex baseband with respect to the data spectrum. Furthermore, SB-Mix module 355 adjusts the gain of the video and data signals according to a control signal derived in FF-AGC module 350.

Video and data signals from SB-Mix module 355 are coupled to SRRC filter 360, which applies a matched filter, typically a square-root raised cosine filter, to the video and data signals. Further decimation of the sampling rate may occur in SRRC filter 360. SRRC filter 360 is coupled to equalizer 370. Equalizer 370 performs adaptive data equalization and video cancellation. FB-AGC module 365 is coupled to equalizer 370 (and vice versa) and provides fine gain adjustment based on a decision-directed measure. Input to FB-AGC module 365 from Slicer 380 is used to derive the decision-directed measure. DDCL (decision-directed carrier loop) module 375 is coupled to equalizer 370 (and vice versa) and provides fine phase/frequency adjustment based on a decision-directed measure. Input to DDCL module 375 from Slicer 380 is used to derive the decision-directed measure.

Equalizer 370 is coupled to Slicer 380, which may be a nearest-element decision device, or other quantizers, used to provide (possible partial) estimates of the data symbols. Both equalizer 370 and Slicer 380 are coupled to output framer 385. Output framer 385 extracts command and control information, payload data, and frames and packages such data. Command and control data is provided to controller 395 from output framer 385, and controller provides control signals to output framer 385, possibly for proper framing of the data, or formatting that may be regionally-specific. Framed data is provided from output framer 385 to FEC 390, which applies error correcting codes to the data to substantially reduce the bit-error-rate. For example, FEC 390 may apply a concatenated reed-solomon block code with a trellis code, similar to what is performed for terrestrial broadcast of digital television signals in the U.S.

Nyquist and CVSB filter outputs for datacasting over NTSC (dNTSC) are at a nominal sample rate, for example, of 8.59 MHz. In such a case, with 8-12 bits of data each, remote communication link 290 can support 137-206.2 Mbps. Control signals from video sync block 345 correspond to the NTSC line rate, and therefore, occur at 525 Hz rate, requiring a modest 8400 bps for 16 bits.

In one embodiment, Partition B data can be taken as the output of SB-Mix module 355, in which case the rate is equivalent to the Nyquist and CVSB 340 output without the control signal from video sync block 345. Hence, in this embodiment, link 290 must support 68.7-103.1 Mbps.

The return channel 495 provides command and control data, like tuner channel selection, at a very low data rate. Return channel 495 may also communicate signal quality to antenna subsystem 250, which can be used to aid the user in placement of antenna subsystem 250 of house 130. For example, an installation procedure may include an antenna placement routine, whereby the user tries various locations in house 130 for antenna subsystem 250 and a graphical user interface displays a measure of signal quality on antenna subsystem 250, receiver subsystem 255, or both.

The wireless techniques discussed for Partition A are suitable to sustain acceptable QOS (quality of service) for the required throughput over remote communication subsystem 275 when selecting Partition B. Furthermore, when selecting Partition B, a wired communication system using existing Ethernet link as remote communication link 290 will sustain acceptable QOS for the required throughput over remote communication subsystem 275. Ethernet links, shared with other household communication networks, are available in a growing number of households.

Partition C: SRRC Output

Figure 6:
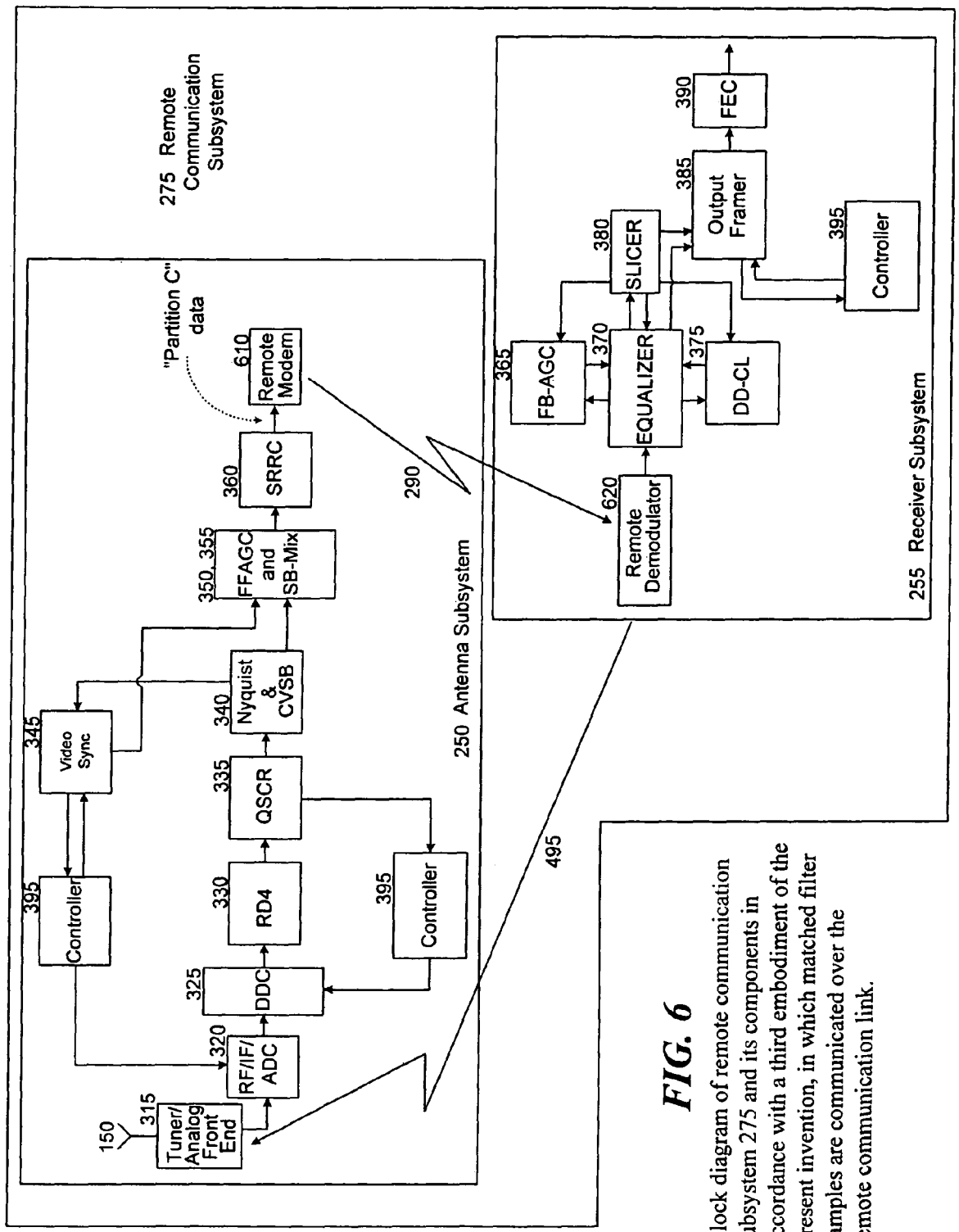
FIG. 6 shows a block diagram of a remote communication subsystem and corresponding components, where matched filter samples are communicated over a remote communication link in accordance with yet another embodiment of the invention.

An alternative embodiment, illustrated in FIG. 6 as Partition C, provides matched filter samples from the antenna subsystem, through the remote communication link 290, to the receiver subsystem 255. FIG. 6 shows a block diagram of the remote communication subsystem 275 in accordance with this alternative embodiment, in which matched filter signals are communicated over the remote communication subsystem 275. Antenna 150 can be a conventional antenna. Alternatively, and desirably, antenna 150 is an active antenna in accordance with the U.S. Patent Application No. 60/351,476 filed Jan. 23, 2002 and titled "Miniature Ultra-Wideband Active Receiving Antenna".

Antenna 150 receives television broadcast signal 120, including television content and digital data, and is coupled to Tuner/Analog Front End module 315. Tuner/Analog Front End module 315 tunes to the proper broadcast television channel, performs level setting, frequency translation, and filtering, and couples the signal to RF/IF/ADC 320. RF/IF/ADC 320 may perform further level setting, frequency translation, and filtering, while it digitizes the analog signal, typically 8-10 bits, and supplies the bit stream to DDC module 325. The sampling clock of RF/IF/ADC 320 is adjusted by clock signals generated in controller 395.

DDC module 325 mixes the digitized signal from DDC module 325 to near baseband, so that the visual carrier is close to DC. Clock signals from controller 395 are used to adjust the digital down-conversion process. DDC module 325 provides the near baseband signal to RD4 filter 330, which decimates the sampling rate without corrupting the integrity of the television and data signals. RD4 filter 330 is coupled to QSCR module 335, which translates the composite television and data signal to baseband, so that the visual carrier is aligned with a zero degree phasor and the data-bearing subcarrier is aligned with a 90-degree phasor. Furthermore, QSCR module 335 estimates frequency offset from this relationship, and provides a control signal to controller 395. Controller 395 processes this control signal from QSCR module 335 and adjusts the clock governing DDC module 325.

QSCR module 335 is coupled to the Nyquist and CVSB block 340, which performs linear filtering to isolate video and data components. The Nyquist and CVSB block 340 also provides a video signal to Video Sync block 345, which performs synchronization and framing to the analog television signal. Video Sync block 345 provides control signals, based on the analog television signal, to controller 395 and FF-AGC module 350. Controller 395 uses the control signals from Video Sync block 345 to adjust the sampling clock of RF/IF/ADC block 320. FF-AGC module 350 uses the control signals from Video Sync block 345 to adjust a gain that is applied to the video and data signals in SB-Mix module 355.

Video and data components from Nyquist and CVSB block 340 are coupled to SB-Mix module 355, which adjusts the frequency by the data sub-carrier frequency to translate the video and data signals to complex baseband with respect to the data spectrum. Furthermore, SB-Mix module 355 adjusts the gain of the video and data signals according to a control signal derived in FF-AGC module 350. Video and data signals from SB-Mix module 355 are coupled to SRRC filter 360, which applies a matched filter, typically a square-root raised cosine filter, to the video and data signals. Further decimation of the sampling rate may occur in SRRC filter 360.

Matched filter samples from SRRC filter 360 form the "Partition C" data, and are to be communicated over remote communication link 290. Therefore, output of SRRC filter 360 is supplied to Remote Modem 610. Remote Modem 610 encodes and modulates the desired television signal, and couples it to remote communication link 290 in accordance with techniques suitable for indoor transmission and reception, which are discussed below.

Remote Demodulator 620 receives the equalized signal via remote communication link 290. Remote Demodulator 620 performs all analog and digital filtering, down-conversion, level setting, equalization, and decoding of the encoded television signal required to recover the equalized signal from 370 that is communicated through remote communication link 290. Remote Demodulator 620 provides the matched filter samples to equalizer 370. Equalizer 370 performs adaptive data equalization and video cancellation. FB-AGC module 365 is coupled to equalizer 370 (and vice versa) and provides fine gain adjustment based on a decision-directed measure.

The input to FB-AGC module 365 from Slicer 380 is used to derive the decision-directed measure. DDCL module 375 is coupled to equalizer 370 (and vice versa) and provides fine phase/frequency adjustment based on a decision-directed measure. Input to DDCL module 375 from Slicer 380 is used to derive the decision-directed measure.

Equalizer 370 is coupled to Slicer 380, which may be a nearest-element decision device, or other quantizers, used to provide (possible partial) estimates of the data symbols. Both equalizer 370 and Slicer 380 are coupled to output framer 385. Output framer 385 extracts command and control information, payload data, and frames and packages such data. Command and control data is provided to controller 395 from output framer 385, and controller provides control signals to output framer 385, possibly for proper framing of the data, or formatting which may be regionally-specific. Framed data is provided from output framer 385 to FEC 390, which applies error correcting codes to the data to substantially reduce the bit-error-rate. For example, FEC 390 may apply a concatenated reed-solomon block code with a trellis code, similar to what is performed for terrestrial broadcast of digital television signals in the U.S.

Matched filter samples from SRRC module 360 are typically 8-16 bits for complex-valued data and video, and occur at a 1.22 MHz rate for dNTSC. Hence, in such a case, remote communication link 290 must support 39-79 Mbps.

Return channel 495 provides command and control data, like tuner channel selection, at a very low data rate. Return channel 495 may also communicate signal quality to antenna subsystem 250, which can be used to aid the user in placement of antenna subsystem 250 of house 130. For example, an installation procedure may include an antenna placement routine, whereby the user tries various locations in house 130 for antenna subsystem 250 and a graphical user interface displays a measure of signal quality on antenna subsystem 250, receiver subsystem 255, or both.

One embodiment of Remote Communication Subsystem 275 for Partition C uses a wireless, frequency-hopped, spread spectrum communication system for Remote Modem 610, Remote Demodulator 620, and remote communication link

290. Security from interfering neighbors is achieved from the keying of pseudo-random sequence which drives the modulated carrier tones.

Another embodiment of Remote Communication Subsystem 275 for Partition C uses a wireless, COFDM communication system for Remote Modem 610, Remote Demodulator 620, and remote communication link 290.

Another embodiment of Remote Communication Subsystem 275 for Partition C uses a wireless communication system combining COFDM and DS-SS for Remote Modem 610, Remote Demodulator 620, and remote communication link 290. In this embodiment, each subcarrier in the COFDM system is spread by a spreading sequence in Remote Modem 610 prior to IDFT filtering, and is de-spread after DFT filtering in Remote Demodulator 620.

Another embodiment of Remote Communication Subsystem 275 for Partition C uses a wireless, single-carrier QAM communication system with trellis and reed-solomon error correcting codes, or turbo codes for Remote Modem 610, Remote Demodulator 620, and remote communication link 290. See U.S. Pat. No. 6,526,101 issued to C. B. Patel.

Another embodiment of Remote Communication Subsystem 275 for Partition C uses existing Ethernet link for Remote Modem 610, Remote Demodulator 620, and remote communication link 290. Ethernet link is available in a growing number of households, shared with other household communication networks.

Another embodiment of the Remote Communication Subsystem 275 for Partition C uses existing 120V 60 Hz power line wirings of the households for Remote Modem 610, Remote Demodulator 620, and remote communication link 290. Current HomePlug hardware can support 14 Mbps, with claims of up to 100 Mbps. European and Asian power standards may use different voltages and frequencies.

Another embodiment of the Remote Communication Subsystem 275 for Partition C uses existing IEEE 802.11a or IEEE 802.11g or 802.11 b hardware for Remote Modem 610, Remote Demodulator 620, remote communication link 290, and return channel 495. This embodiment can be implemented almost entirely with commercially available components, since both IEEE 802.11a and 802.11g support the desired throughput for Partition C, have inherent security to prevent cross-talk between neighbors, and are bi-directional.

Partition D: Framer Output

Figure 7:
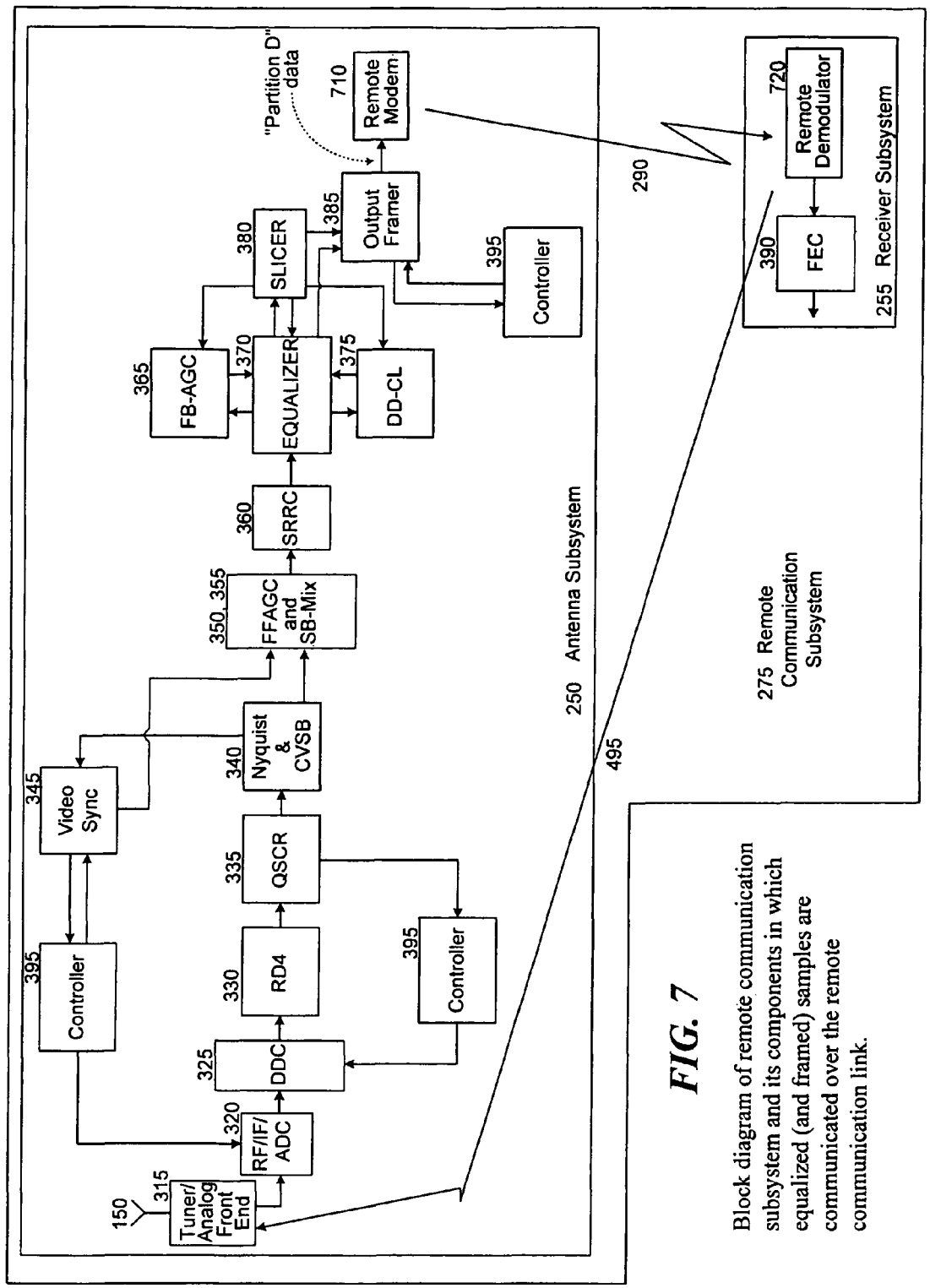
FIG. 7 shows a block diagram of a remote communication subsystem and corresponding components, where equalized (and framed) samples are communicated over a remote communication link in accordance with an embodiment of the invention.

An alternative embodiment of the invention, depicted in FIG. 7 as Partition D, delivers equalized and framed samples from Output Framer 385, through remote communication link 290, to the receiver subsystem 255. Antenna 150 can be a conventional antenna. Alternatively, and desirably, antenna 150 is an active antenna in accordance with U.S. Patent Application No. 60/351,476 filed Jan. 23, 2002 and entitled "Miniature Ultra-Wideband Active Receiving Antenna". Antenna 150 receives DTV broadcast signal 120, and is coupled to DTV Receiver 300. Recovered video signal, typically MPEG packets, is supplied to Remote Modem 710. Remote Modem 710 encodes and modulates the desired television signal, and couples it to remote communication link 290 in accordance with techniques suitable for indoor transmission and reception, discussed below. Remote Modem 710 is coupled to remote communication link 290.

Remote Demodulator 720 receives the recovered equalized and framed samples via remote communication link 290. Remote Demodulator 720 performs all analog and digital filtering, down-conversion, level setting, equalization, and decoding of the encoded television signals that were communicated through remote communication link 290.

Equalized and framed samples are typically 2-8 bits at a rate of 613 KHz for dNTSC. Hence, remote communication link 290 must support 1.3-9.8 Mbps, with real-valued symbol estimates or complex-valued soft decisions. Techniques suitable for indoor reception supporting this data rate are discussed below.

Return channel 495 provides command and control data, like tuner channel selection, at a very low data rate. Return channel 495 may also communicate signal quality to antenna subsystem 250, which can be used to aid the user in placement of antenna subsystem 250 of house 130. For example, an installation procedure may include an antenna placement routine, whereby the user tries various locations in house 130 for antenna subsystem 250, in which case a graphical user interface displays a measure of signal quality on antenna subsystem 250, receiver subsystem 255, or both.

One embodiment of Remote Communication Subsystem 275 for Partition D uses existing IEEE 802.11a or IEEE 802.11g hardware for Remote Modem 710, Remote Demodulator 720, remote communication link 290, and return channel 495. This embodiment can be implemented almost entirely with commercially available components, since both IEEE 802.11a and 802.11g support the desired throughput for Partition D, have inherent security to prevent cross-talk between neighbors, and are bi-directional.

Another embodiment of Remote Communication Subsystem 275 for Partition D uses existing 120V 60 Hz power line wirings available in the households for Remote Modem 710, Remote Demodulator 720, and remote communication link 290. Current HomePlug hardware can support 14 Mbps, which satisfies the desired throughput of Partition D. European and Asian power standards may use different voltages and frequencies.

Another embodiment of Remote Communication Subsystem 275 for Partition D uses a wireless, frequency-hopped, spread spectrum communication system for Remote Modem 710, Remote Demodulator 720, and remote communication link 290. Security from interfering neighbors is achieved from the keying of pseudo-random sequence which drives the modulated carrier tones.

Another embodiment of Remote Communication Subsystem 275 for Partition D uses a wireless, COFDM communication system for Remote Modem 710, Remote Demodulator 720, and remote communication link 290.

Another embodiment of Remote Communication Subsystem 275 for Partition D uses a wireless communication system combining COFDM and DS-SS for Remote Modem 710, Remote Demodulator 720, and remote communication link 290. In this embodiment, each subcarrier in the COFDM system is spread by a spreading sequence in Remote Modem 710 prior to IDFT filtering, and de-spread after DFT filtering in Remote Demodulator 720.

Another embodiment of Remote Communication Subsystem 275 for Partition D uses a wireless, single-carrier QAM communication system with trellis and reed-solomon error correcting codes, or turbo codes for Remote Modem 710, Remote Demodulator 720, and remote communication link 290. See U.S. Pat. No. 6,526,101 issued to C. B. Patel.

Another embodiment of Remote Communication Subsystem 275 for Partition D uses existing Ethernet link, available in a growing number of households, shared with other household communication networks, for Remote Modem 710, Remote Demodulator 720, and remote communication link 290.

Partition E: FEC Output

Figure 8:
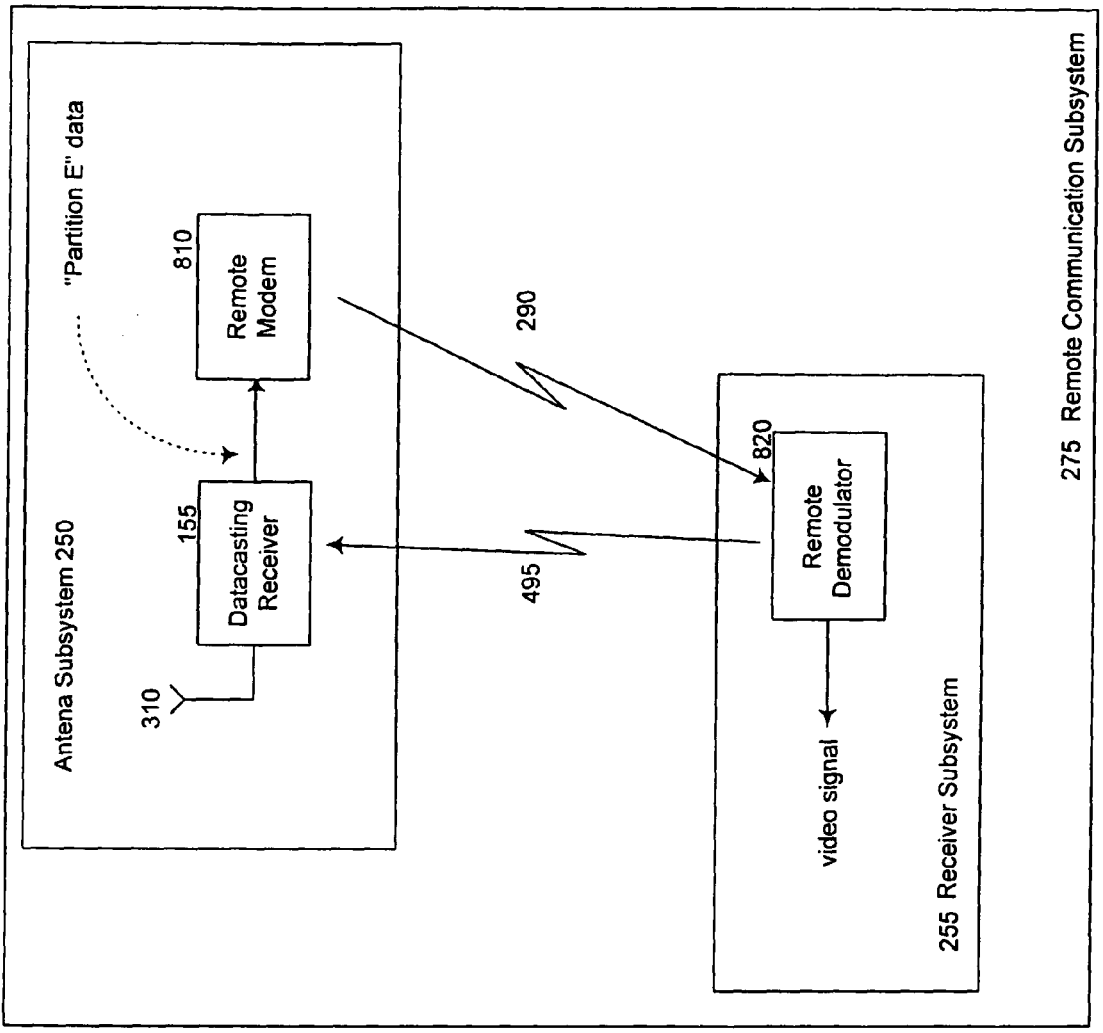
FIG. 8 shows a block diagram of a remote communication subsystem and corresponding components, where MPEG (motion picture entertainment group) transport stream data from a datacasting receiver is communicated over a remote communication link in accordance with yet another embodiment of the invention.

An alternative embodiment of the invention provides MPEG encoded packets from DTV Receiver 300, via remote communication link 290, to the receiver subsystem 255. FIG. 8 shows a block diagram of the remote communication subsystem 275 in accordance with this alternative embodiment of the invention, in which MPEG encoded packets from datacasting receiver 155 are communicated over the remote communication subsystem 275.

Antenna 150 can be a conventional antenna. Alternatively, and desirably, antenna 150 is an active antenna in accordance with U.S. Patent Application No. 60/351,476 filed Jan. 23, 2002 and titled "Miniature Ultra-Wideband Active Receiving Antenna". Antenna 150 receives DTV broadcast signal 120, and is coupled to datacasting receiver 155. Recovered video signal, typically MPEG packets, is supplied to Remote Modem 810. Remote Modem 810 encodes and modulates the desired television signal, and couples it to remote communication link 290 in accordance with techniques suitable for indoor transmission and reception, which are discussed later.

Remote Demodulator 820 receives the recovered video signal, typically MPEG packets, via remote communication link 290. Remote Demodulator 820 performs all analog and digital filtering, down-conversion, level setting, equalization, and decoding of the encoded television signal required for recovering the MPEG packets from datacasting receiver 155 that were communicated through remote communication link 290. Standard techniques can be used to display the MPEG packets on a television. For example, MPEG samples for dNTSC (data on national television systems committee) occur at 0.9-3.5 Mbps.

Return channel 495 provides command and control data, like tuner channel selection, at a very low data rate. Return channel 495 may also communicate signal quality to antenna subsystem 250, which can be used to aid the user in placement of antenna subsystem 250 of house 130. For example, an installation procedure may include an antenna placement routine, whereby the user tries various locations in house 130 for antenna subsystem 250, in which case a graphical user interface displays a measure of signal quality on antenna subsystem 250, receiver subsystem 255, or both.

One embodiment of Remote Communication Subsystem 275 for Partition E uses existing IEEE 802.11a or IEEE 802.11g or 802.11b hardware for Remote Modem 810, Remote Demodulator 820, remote communication link 290, and return channel 495. This embodiment can be implemented almost entirely with commercially available components, since both IEEE 802.11a and 802.11g and 802.11b support the desired throughput for Partition E, have inherent security to prevent cross-talk between neighbors, and are bi-directional.

Another embodiment of Remote Communication Subsystem 275 for Partition E uses existing 120V 60 Hz power line cables available in the households for Remote Modem 810, Remote Demodulator 820, and remote communication link 290. Current HomePlug hardware can support 14 Mbps, which satisfies the desired throughput for Partition E. European and Asian power standards may use different voltages and frequencies.

Another embodiment of Remote Communication Subsystem 275 for Partition E uses a wireless, frequency-hopped, spread spectrum communication system for Remote Modem 710, Remote Demodulator 720, and remote communication link 290. Security from interfering neighbors is achieved from the keying of pseudo-random sequence which drives the modulated carrier tones.

Another embodiment of Remote Communication Subsystem 275 for Partition E uses a wireless, COFDM communication system for Remote Modem 810, Remote Demodulator 820, and remote communication link 290.

Another embodiment of Remote Communication Subsystem 275 for Partition E uses a wireless communication system combining COFDM and DS-SS for Remote Modem 810, Remote Demodulator 820, and remote communication link 290. In this embodiment, each subcarrier in the COFDM system is spread by a spreading sequence in Remote Modem 810 prior to IDFT filtering, and is de-spread after DFT filtering in Remote demodulator 820.

Another embodiment of Remote Communication Subsystem 275 for Partition E uses a wireless, single-carrier QAM communication system with trellis and reed-solomon error correcting codes, or turbo codes for Remote Modem 810, Remote Demodulator 820, and remote communication link 290. See U.S. Pat. No. 6,526,101 issued to C. B. Patel.

Another embodiment of Remote Communication Subsystem 275 for Partition E uses existing Ethernet link, available in a growing number of households, shared with other household communication networks, for Remote Modem 810, Remote Demodulator 820, and remote communication link 290.

Figure 9:
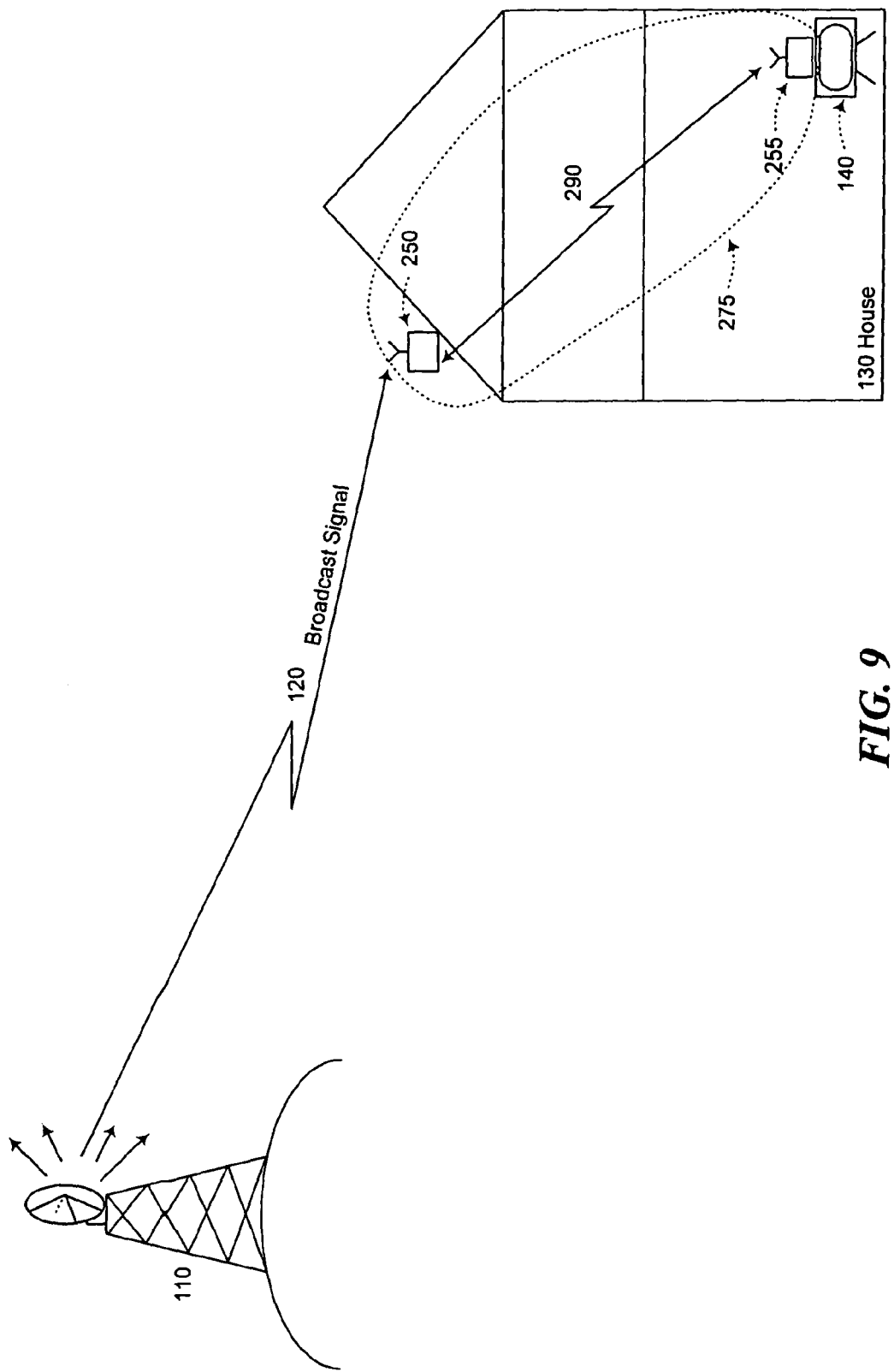
FIG. 9 shows a television broadcast communication system in accordance with an embodiment of the invention with outdoor antenna subsystem.

FIG. 9 shows a television broadcast communication system in an embodiment where the antenna subsystem 250 is placed outside the household. In such cases, one embodiment of the invention uses solar power for remote antenna subsystem 250. Using previously described wireless communication techniques for remote communication subsystem 275, antenna subsystem 250 placed outside of the dwelling requires no cabling. Other embodiments of the invention may use rechargeable or disposable batteries, wind, AC, or low-voltage DC to power the antenna subsystem 250 when it is placed outside the household.

Figure 10:
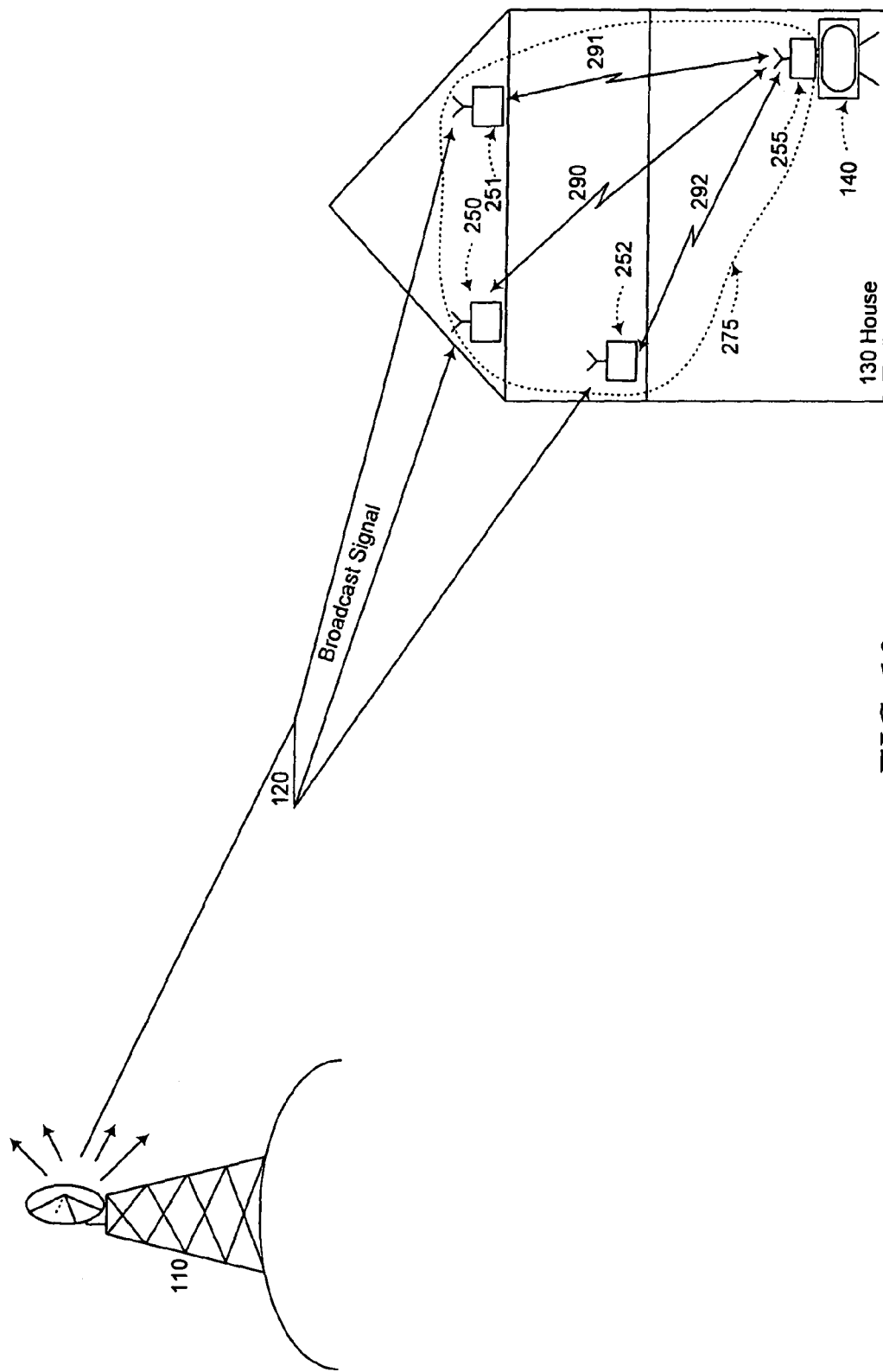
FIG. 10 shows a television broadcast communication system in accordance with an embodiment of the invention using a single receiver subsystem which combines signals from multiple antenna subsystems (three shown).

FIG. 10 shows a television broadcast communication system using a single receiver subsystem, which combines signals from multiple antenna subsystems (three shown), in accordance with an embodiment of the invention. Television signal 120 radiates to antenna subsystems 250, 251, and 252. Antenna subsystem 250, 251, and 252 are located in different parts of the house, like the attic or top floor or near a window, possibly for distinct transmit towers (for different television channels). Antenna subsystem 250 communicates the information to receiver subsystem 255 through remote communication link 290. Antenna subsystem 251 communicates the information to receiver subsystem 255 through remote communication link 291. Antenna subsystem 252 communicates the information to receiver subsystem 255 through remote communication link 292.

Receiver subsystem 255 combines the three signals from communications links 290, 291, and 292 using known combining and selecting methods to one skilled in the art. Furthermore, three antenna subsystems are shown for illustrative purposes only. It is understood to one skilled in the art how to perform combining and selecting for any number of antenna subsystems.

An alternative embodiment of the invention requires similar throughput to Partition E, and places the entire set-top-box in antenna subsystem 250. For example, Walt Disney's MovieBeam service uses about 160 Gbyte hard drive to store movies on the set-top-box, which are accessed on a pay-per-view basis (the rented movie remains viewable for the entire viewing period, typically 24 hours, during which time the movie can be stopped and re-started at any point during the movie, and as many times as possible in the rental period). By placing the hard drive in the antenna subsystem 250, the noises associated with the hard drive, and supporting fans, are moved away from the viewing area and consumer. Remote communication link 495 communicates to the hard drive and supporting circuitry to select the rented movie.

An alternative embodiment of the invention uses an automobile in place of a house 130.

Embodiments of the invention have been described in terms of broadcast television signals, which are to be displayed on televisions. As would be apparent to one skilled in the art, a personal computer, laptop computer, monitor, other viewing device, or storage device (like a hard-drive) can be used in place of a television.

The above embodiments of the invention have been described in terms of television signals which carry standard analog video, such as NTSC or PAL, together with a data-bearing sub-carrier that is placed in quadrature to the visual carrier. As would be apparent to one skilled in the art, the aspects of the invention can be used for any datacasting techniques over analog television. For example, multiple sub-carriers can be used instead of a single subcarrier; spread spectrum methods can be used for data insertion; OFDM methods can be used for data insertion.

The above embodiments have been described in terms of analog television signals such as NTSC or PAL. As would be apparent to one skilled in the art, the aspects of the invention can be used for any derivate of NTSC or PAL, or other analog television broadcast standard.

The U.S. Pat. No. 6,433,835, titled "Expanded information capacity for existing communication systems," issued to Ted Hartson et al., also describes a method of data insertion into analog television which uses the aural carrier instead of the visual carrier of the analog television signal. The aural information is frequency modulated (FM) onto the aural carrier; the digital data is negative amplitude modulated (AM) on top of the already FM aural carrier. Since most conventional FM tuners in the television receiver limit or strip off the amplitude modulated (AM) of the frequency modulated (FM) carrier, the digital data causes negligible perceptive degradation to the television audio. As would be apparent to one skilled in the art, the invention can be used for any datacsting system which inserts its digital information by negative AM of the FM aural carrier in the analog television signal. Furthermore, as would be apparent to one skilled in the art, the invention can be used for any partition of the datacasting receiver that recovers its digital data from the FM aural carrier.

While specific circuitry may be employed to implement the above embodiments, aspects of the invention can be implemented in a suitable computing environment. Although not required, aspects of the invention may be implemented as computer-executable instructions, such as routines executed by a general-purpose computer, e.g., a server computer, wireless device or personal computer. Those skilled in the relevant art will appreciate that the aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs (personal computers), mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the processes explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

The embodiments of the invention have been described in terms of datacast signals that are to be displayed on a single television in the household. As would be apparent to one skilled in the art, aspects of the invention can be used to display the television signal on a plurality of televisions or viewing devices in the household. Furthermore, the household can be a multiple dwelling unit, whereby to distribute the data-bearing broadcast signal to a plurality of users in the complex.

As would be apparent to one skilled in the art, the various functions of modulation, demodulation, filtering, synchronization, signal combining, and automatic gain control may be implemented with circuit elements or may also be implemented in the digital domain as processing steps in a software program. Such software may be employed in, for example, a digital signal processor, micro-controller, or general-purpose computer.

Aspects of the invention can be embodied in the form of methods and apparatuses for practicing those methods or in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. These aspects can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing different aspects of the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

Unless the context clearly requires otherwise, throughout this document, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein," "above" and "below" and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number respectively.

The teachings of the invention provided herein can be applied to other systems, not necessarily the system described herein. The elements and acts of the various embodiments described above can be combined to provide further embodiments. All of the above patents and applications and other references, including any that may be listed in accompanying filing papers and commonly assigned U.S. Utility patent application Ser. No. 10/980,879, filed Nov. 2, 2004, entitled "Remote Antenna, Such as For Indoor Reception of Broadcast Television Signals", U.S. Utility patent application entitled "Symbol Error Based Compensation Methods for Nonlinear Amplifier Distortion," filed Apr. 18, 2005, assigned to Dotcast, and the PCT Application entitled "Data Insertion Techniques for Expanding Information Capacity of Existing Communication Systems," filed Apr. 15, 2005, assigned to Dotcast, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein. Particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

We claim:

1. An apparatus for wirelessly receiving a terrestrial television broadcast signal carrying a data component together with a video component, processing the signal, and providing the processed signal to a display device at a dwelling, the apparatus comprising:

an antenna subsystem configured to be placed in or about the dwelling, and configured to:
receive the terrestrial television broadcast signal carrying the data component together with the video component from a transmitter station configured to wirelessly transmit the terrestrial television broadcast signal carrying the data component together with the video component to multiple antenna subsystems placed in or about one or more dwellings,
perform a set of preprocesses on the terrestrial television broadcast signal carrying the data component together with the video component, and
transmit the preprocessed signal to a receiver subsystem, over a remote communication link, via a remote modem that encodes and modulates the preprocessed signal
wherein the antenna subsystem is located remote from the transmitter station and remote from the receiver subsystem; and
a receiver subsystem configured to be collocated with the display device, and configured to:
receive the encoded and modulated preprocessed signal from the antenna subsystem, and
demodulate the received encoded and modulated preprocessed signal using a remote demodulator, wherein the remote demodulator is configured to recover the signal
wherein the receiver subsystem is located remote from the transmitter station and remote from the antenna subsystem,
wherein the antenna subsystem and the receiver subsystem can be configured to use a return channel to provide command and control data from the receiver subsystem to the antenna subsystem, and
wherein the antenna subsystem and the receiver subsystem together includes a plurality of components in accordance with a selected partition, wherein the plurality of components includes a tuner module configured to tune to a broadcast channel of the terrestrial television broadcast signal wirelessly transmitted from the transmitter station and carrying the data component together with the video component, an RF/IF/ADC (radio-frequency/intermediate-frequency/analog-to-digital converter) configured to digitize a signal, a downconvert module coupled to the RF/IF/ADC and configured to mix the digitized signal from the RF/IF/ADC to near baseband, a decimating filter coupled to the downconvert module and configured to reduce a sampling rate of the digitized signal, a recovery module coupled to the decimating filter and configured to translate the digitized signal to baseband and to provide a control signal to a controller, and a linear filter coupled to the recovery module and configured to isolate the video and data components of the digitized signal.

2. The apparatus of claim 1, wherein the selected partition separates the antenna subsystem and the receiver subsystem so that the antenna subsystem includes the tuner module and the receiver subsystem includes the RF/IF/ADC.

3. The apparatus of claim 1, wherein the plurality of components further includes:

a video-sync module configured to synchronize and frame a signal received from the linear filter to an analog television signal and to provide control signals based on the analog television signal, wherein the video-sync module is configured to provide the control signals to the controller and to an FF-AGC (feed-forward-automatic-gain-control) module;

an SB-Mix (sub-band mix) module configured to adjust a frequency of the signal received from the linear filter by a data sub-carrier frequency to translate the video and data components to complex baseband with respect to a frequency spectrum of the data sub-carrier, and to adjust a gain of the video and data components;

an SRRC filter coupled to the SB-Mix module and configured to further decimate the sampling rate of a signal received from the SB-Mix Module;

a slicer;

an equalizer coupled to the slicer;

an output framer configured to frame an output from the equalizer wherein both the equalizer and the slicer are coupled to the output framer; and an FEC (forward error correction) module configured to receive framed data from the output framer and to apply error correcting codes to the framed data.

4. The apparatus of claim 3, further comprising an FF-AGC (feedback automatic gain control) module configured to use the control signals from the video-sync module to adjust a gain that is applied to the video and data signals in the SB-Mix module.

5. The apparatus of claim 3, wherein the SB-Mix (sub-band mix) adjusting of the gain of the video and data components is according to a control signal derived in a FF-AGC (feedback automatic gain control) module.

6. The apparatus of claim 3, wherein the SRRC filter is configured to apply a matched filter to the video and data signals or to apply a matched filter to the video and data signals and further decimate the sampling rate.

7. The apparatus of claim 3, wherein the equalizer is configured to perform adaptive data equalization and video cancellation.

8. The apparatus of claim 3, further comprising an FB-AGC (feedback automatic gain control) module coupled to the equalizer and configured to provide gain adjustment based on a decision-directed measure, wherein the FB-AGC module is configured to use an input from the slicer to derive a decision-directed measure.

9. The apparatus of claim 3, further comprising a DDCL (decision-directed carrier loop) module coupled to the equalizer configured to provide phase/frequency adjustments based on the decision-directed measure and wherein an input to DDCL module from the slicer is configured to derive the decision-directed measure.

10. The apparatus of claim 3 wherein the slicer is a nearest-element decision device.

11. The apparatus of claim 3, wherein the FEC module is configured to apply a concatenated reed-solomon block code with a trellis code.

12. The apparatus of claim 3 wherein the selected partition is selected from predefined partitions available between the antenna subsystem and the receiver subsystem.

13. The apparatus of claim 12 wherein a predefined partition partitions the apparatus between the tuner and the RF/IF/ADC.

14. The apparatus of claim 12 wherein a predefined partition partitions the apparatus between the linear filter and the SB-Mix module.

15. The apparatus of claim 12 wherein a predefined partition partitions the apparatus between the SRRC filter and the equalizer.

16. The apparatus of claim 12 wherein a predefined partition partitions the apparatus between the output framer and the FEC module.

17. The apparatus of claim 12 wherein a predefined partition partitions the apparatus after the FEC module.

18. The apparatus of claim 1, wherein the tuner module is further configured to perform frequency translation and filtering.

19. The apparatus of claim 1, wherein the RF/IF/ADC is further configured to perform level setting, frequency translation, and filtering, wherein a sampling clock of the RF/IF/ADC is adjusted by clock signals generated in a controller.

20. The apparatus of claim 1, wherein the decimating filter is configured to reduce the sampling rate without corrupting integrity of the video and data signals.

21. The apparatus of claim 1, further comprising at least one controller configured to use the control signals from the video-sync block and the recovery module to adjust the sampling clocks of the RF/IF/ADC and the downconvert modules, respectively.

22. The apparatus of claim 1, wherein the command and control information is provided to a controller configured to provide control signals to an output framer to instruct for proper framing of the data or of formatting which may be regionally-specific.

23. The apparatus of claim 1, wherein the antenna subsystem further comprises a conventional television antenna or an active antenna.

24. The apparatus of claim 1, wherein the return channel is further configured to communicate signal quality to the antenna subsystem during an installation procedure, and a graphical user interface is configured to display a measure of signal quality on the antenna subsystem, the receiver subsystem, or both.

25. The apparatus of claim 1, wherein another stage of down-conversion, level setting, and IF (intermediate frequency) filtering is implemented.

26. In a television signal broadcasting and receiving arrangement where a transmitter wirelessly broadcasts a composite signal having ancillary data and a television signal, to electronic equipment in a structure, an apparatus for wirelessly receiving the composite signal, processing the composite signal, and providing the processed composite signal to the electronic equipment at the structure, the apparatus comprising:

an antenna subsystem configured to be spaced apart from the transmitter and placed in or about the structure, and configured to receive the composite signal having ancillary data and a television signal from the transmitter, configured to perform a set of preprocesses on the composite signal having ancillary data and a television signal, and configured to transmit the preprocessed composite signal to a receiver subsystem located near the electronic equipment; and the receiver subsystem, configured to be spaced apart from the antenna subsystem and the transmitter, configured to receive the preprocessed composite signal from the antenna subsystem, configured to perform further processes on the composite signal, configured to provide the further processed composite signal to the electronic equipment at the structure, and configured to transmit control signals to the antenna subsystem wherein the antenna subsystem and the receiver subsystem compose a configuration capable of performing a set of preprocesses and further processes on the composite signal, wherein the configuration comprises a tuner module configured to tune to a broadcast channel of the television signal of the composite signal wirelessly broadcast from the transmitter, an RF/IF/ADC (radio-frequency/intermediate-frequency/analog-to-digital converter) configured to digitize a signal corresponding to the tuned to broadcast channel of the composite signal broadcast from the transmitter, a downconvert module coupled to the RF/IF/ADC and configured to mix the digitized signal from the RF/IF/ADC to near baseband, and a decimating filter coupled to the downconvert module and configured to reduce a sampling rate of the digitized signal wherein the configuration is selectively partitioned between the antenna subsystem and the receiver subsystem, and wherein the receiver subsystem and the antenna subsystem are capable of two-way communication with each other wirelessly and/or through wired transmission mediums within the structure.

27. The apparatus of claim 26, wherein television signals which carry standard analog video are transmitted together with a data-bearing sub-carrier that is placed in quadrature to a visual carrier, and wherein multiple sub-carriers are used, spread spectrum methods are used for data insertion, and OFDM (orthogonal frequency division multiplexing) methods are used for data insertion, or any combination thereof.

28. The apparatus of claim 26, wherein the antenna subsystem uses solar-power, rechargeable or disposable batteries, wind power, alternating current (AC) power, or low-voltage direct current (DC) power.

29. The apparatus of claim 26, wherein the two-way communication comprises command-and-control signals and signals indicating reception quality measurements, and wherein two-way communication between the antenna subsystem and the receiver subsystem, comprises at least:
a wireless, frequency-hopped, spread spectrum communication system configured to modulate carrier tones based on a keying of a pseudo-random sequence.

30. The apparatus of claim 26 wherein the ancillary data includes digital information, and wherein the digital information is inserted by negative AM of an FM aural carrier in the television signal, and wherein the antenna subsystem or the receiver subsystem is configured to recover the digital information from the FM aural carrier.

31. The apparatus of claim 26 wherein the structure is an automobile.

32. The apparatus of claim 26 wherein an entire set-top-box is placed in the antenna subsystem.

33. The apparatus of claim 26, wherein the two-way communication comprises command-and-control signals and signals indicating reception quality measurements, and wherein two-way communication between the antenna subsystem and the receiver subsystem, comprises at least:
a wireless COFDM (coded orthogonal frequency division multiplexing) communication system.

34. The apparatus of claim 26, wherein the two-way communication comprises command-and-control signals and signals indicating reception quality measurements, and wherein two-way communication between the antenna subsystem and the receiver subsystem, comprises at least:
a wireless communication system combining COFDM and DS-SS (direct sequence spread spectrum), wherein each sub-carrier in the COFDM system is spread by a spreading sequence prior to IDFT (inverse discrete Fourier transform) filtering, and de-spread after DFT (discrete Fourier transform) filtering.

35. The apparatus of claim 26, wherein the two-way communication comprises command-and-control signals and signals indicating reception quality measurements, and wherein two-way communication between the antenna subsystem and the receiver subsystem, comprises at least:
a wireless, single-carrier QAM (quadrature amplitude modulation) communication system with trellis and reed-solomon error correcting codes or a communication system with turbo codes.

36. The apparatus of claim 26, wherein the two-way communication comprises command-and-control signals and signals indicating reception quality measurements, and wherein two-way communication between the antenna subsystem and the receiver subsystem, comprises at least:
an existing Ethernet link, shared with other communication networks in the structure.

37. The apparatus of claim 26, wherein the two-way communication comprises command-and-control signals and signals indicating reception quality measurements, and wherein two-way communication between the antenna subsystem and the receiver subsystem, comprises at least:
an existing power distribution network in the structure.

38. The apparatus of claim 26, wherein the two-way communication comprises command-and-control signals and signals indicating reception quality measurements, and wherein two-way communication between the antenna subsystem and the receiver subsystem, comprises at least:
an existing IEEE 802.11a or IEEE 802.11g system in the structure.

39. The apparatus of claim 1 wherein the transmitter station is not directly connected to the antenna subsystem or any other device directly connected to the antenna subsystem, wherein the transmitter station is not directly connected to the receiver subsystem or any other device directly connected to the receiver subsystem, and wherein the antenna subsystem is not directly connected to the receiver subsystem or any other device directly connected to the receiver subsystem.

40. The apparatus of claim 1, wherein IF output samples from the tuner module are directly supplied with no intermediate down-conversion.

41. The apparatus of claim 26 wherein the configuration is selectively partitioned by selecting from predefined partitions available between the antenna subsystem and the receiver subsystem.

42. The apparatus of claim 41 wherein a predefined partition partitions the apparatus between the tuner and the RF/IF/ADC.

43. The apparatus of claim 41, wherein the configuration further comprises:
a linear filter configured to isolate the video and data components of the digitized signal;
a video-sync module configured to synchronize and frame a signal received from the linear filter to an analog television signal and to provide control signals based on the analog television signal, wherein the video-sync module is configured to provide the control signals to the controller and to an FF-AGC (feed-forward-automatic-gain-control) module;
an SB-Mix (sub-band mix) module configured to adjust a frequency of the signal received from the linear filter by a data sub-carrier frequency to translate the video and data components to complex baseband with respect to a frequency spectrum of the data sub-carrier, and to adjust a gain of the video and data components;
an SRRC filter coupled to the SB-Mix module and configured to further decimate the sampling rate of a signal received from the SB-Mix Module;
a slicer;
an equalizer coupled to the slicer;
an output framer configured to frame an output from the equalizer wherein both the equalizer and the slicer are coupled to the output framer; and
an FEC (forward error correction) module configured to receive framed data from the output framer and to apply error correcting codes to the framed data.

44. The apparatus of claim 43 wherein a predefined partition partitions the apparatus between the linear filter and the SB-Mix module.

45. The apparatus of claim 43 wherein a predefined partition partitions the apparatus between the SRRC filter and the equalizer.

46. The apparatus of claim 43 wherein a predefined partition partitions the apparatus between the output framer and the FEC module.

47. The apparatus of claim 43 wherein a predefined partition partitions the apparatus after the FEC module.

* * * * *